US009904610B2

(12) United States Patent
Bennah et al.

(10) Patent No.: US 9,904,610 B2
(45) Date of Patent: Feb. 27, 2018

(54) CONFIGURATION OF SERVERS FOR BACKUP

(71) Applicant: Lenovo Enterprise Solutions (Singapore) PTE. LTD., Singapore (SG)

(72) Inventors: Albert D. Bennah, Cary, NC (US); David B. Roberts, Cary, NC (US); Adrian X. Rodriguez, Durham, NC (US); Ying Zuo, San Jose, CA (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 302 days.

(21) Appl. No.: 13/762,470

(22) Filed: Feb. 8, 2013

(65) Prior Publication Data

US 2014/0229589 A1 Aug. 14, 2014

(51) Int. Cl.
*G06F 15/177* (2006.01)
*G06F 11/20* (2006.01)

(52) U.S. Cl.
CPC ...... *G06F 11/2041* (2013.01); *G06F 11/2025* (2013.01); *G06F 11/2028* (2013.01); *G06F 11/2048* (2013.01)

(58) Field of Classification Search
USPC ....................................................... 709/221
See application file for complete search history.

(56) References Cited

U.S. PATENT DOCUMENTS

| 7,334,157 | B1* | 2/2008 | Graf et al. ................... 714/13 |
| 7,441,091 | B2 | 10/2008 | Sogabe |
| 7,680,957 | B1* | 3/2010 | Ketterhagen et al. ........ 709/220 |
| 7,734,596 | B2 | 6/2010 | Vivian et al. |
| 8,234,515 | B2 | 7/2012 | Collier et al. |
| 8,316,110 | B1* | 11/2012 | Deshmukh et al. .......... 709/220 |
| 2003/0140050 | A1* | 7/2003 | Li ..................... G06F 17/30578 |
| 2005/0229175 | A1* | 10/2005 | McCrory ............. G06F 9/4401 717/177 |

(Continued)

OTHER PUBLICATIONS

Article ID: 283676, last review May 10, 2004, Revision: 1.3; How to use the alternate configuration feature for multiple network connectivity in Windows XP; http://support.microsoft.com/kb/283676; last accessed Jan. 16, 2013.

(Continued)

*Primary Examiner* — Nicholas Taylor
*Assistant Examiner* — Sanjoy Roy
(74) *Attorney, Agent, or Firm* — Olive Law Group, PLLC (57) ABSTRACT

Configuration of servers for backup are disclosed herein. According to an aspect, a method includes storing first configuration information used to configure a first server. The method also includes storing second configuration information associated with the first server. The second configuration information may be designated as available for use by a second server when backup is needed for the first server. The method also includes determining whether backup is needed for the first server. Further, the method includes providing the first and second configuration information for use in configuring the second server to back up the first server in response to determining that backup is needed for the first server.

19 Claims, 3 Drawing Sheets

(56) References Cited

U.S. PATENT DOCUMENTS

| | | | |
|---|---|---|---|
| 2006/0010176 A1* | 1/2006 | Armington | G06F 9/4856 |
| 2009/0013423 A1* | 1/2009 | Kriz | C07K 14/415 |
| | | | 800/260 |
| 2009/0077557 A1* | 3/2009 | Ichikawa et al. | 718/102 |
| 2009/0100158 A1* | 4/2009 | Sonkin et al. | 709/221 |
| 2009/0132683 A1* | 5/2009 | Furuyama et al. | 709/220 |
| 2009/0193102 A1* | 7/2009 | Trujillo | 709/220 |
| 2010/0100611 A1* | 4/2010 | Hatasaki | G06F 13/00 |
| | | | 709/221 |
| 2011/0090788 A1 | 4/2011 | Hicks, III | |
| 2011/0252135 A1* | 10/2011 | Kudo | G06F 9/5044 |
| | | | 709/224 |

OTHER PUBLICATIONS

U.S. Non-Final Office Action dated Feb. 13, 2015 for U.S. Appl. No. 13/784,889.

U.S. Final Office Action dated Jul. 27, 2015 for U.S. Appl. No. 13/784,889.

Response to U.S. Non-Final Office Action dated Feb. 13, 2015 for U.S. Appl. No. 13/784,889.

* cited by examiner

CONFIGURATION OF SERVERS FOR BACKUP

BACKGROUND

Field of the Invention

The present invention relates to computing devices, and more specifically, to configuration of servers for backup.

Description of Related Art

Servers may be collected together in a server farm or server cluster for meeting the needs of an enterprise, such as a business or other organization. Server farms often have backup servers, which can take over the function of primary servers in the event of a primary server failure. If a server fails with a given server profile, the selected backup server may have more resources and resource configurations than the failed server. Applying the failed server's profile or configuration information to the backup server can cause some of these resources to be misconfigured. In this case, unintentional problems can occur when failing-over to the backup server. It may also cause the system to not fail over given the mismatch in configurations from the primary server to the backup server. In view of these and other problems, it is desirable to provide improved techniques for configuring backup servers.

BRIEF SUMMARY

Configuration of servers for backup are disclosed herein. According to an aspect, a method includes storing first configuration information used to configure a first server. The method also includes storing second configuration information associated with the first server. The second configuration information may be designated as available for use by a second server when backup is needed for the first server. The method also includes determining whether backup is needed for the first server. Further, the method includes providing the first and second configuration information for use in configuring the second server to back up the first server in response to determining that backup is needed for the first server.

DETAILED DESCRIPTION

Exemplary systems and methods for configuring servers for backup in accordance with embodiments of the present invention are disclosed herein. Particularly, described herein is a system including multiple servers. Each server may manage one or more computing devices. The servers and computing devices may be part of an enterprise computing network or other type of computing network. The servers may include one or more primary server and multiple backup servers. A primary server may be backed up by one or more backup servers. A control server may be configured to store configuration information for use in configuring a primary server. The control server may also store other configuration associated with the primary server and designated as being available for use by a backup server when backup is needed for the primary server. This other configuration information can be applicable to a backup server that is of a different type than the primary server. As a result, a different type of backup server may be utilized for failing-over from the backup server without misconfiguration. In response to determining that backup is needed for the primary server, the configuration information may be used to configure a backup server of the same type or of a different type to backup the primary server.

It is noted that systems and methods disclosed herein may be practiced in various embodiments. For example, systems and methods disclosed herein may be implemented with servers, network communications devices, or other computing devices comprising hardware, software, firmware, and combinations thereof.

As referred to herein, a "server" may be a computing device configured to run one or more services to meet the requirements of other computing devices on a network. As an example, a server may be a database server, file server, mail server, print server, web server, gaming server, or the like. In a client-server architecture, a server may be a computer program running to meet the requirements of other programs or clients. In the context of Internet Protocol (IP) networking, a server is a program that operates as a socket listener. In an example, a server can provide services across a network, either to private users inside a large organization or to public users via the Internet. A server may include one or more processors or processing units, a system memory, and a bus that couples various system components including system memory to processors.

Figure 1:
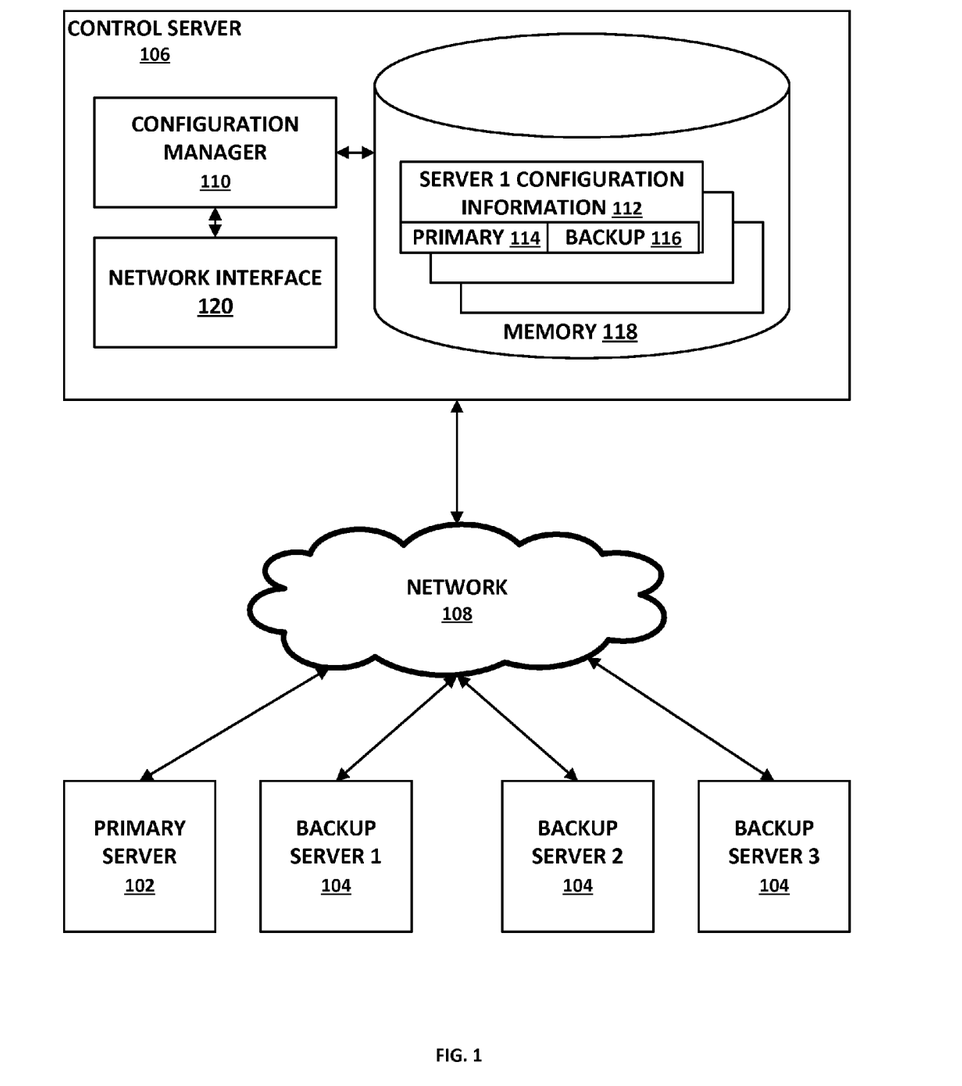
FIG. 1 is a block diagram of a system for configuration of servers for backup within an enterprise computing network in accordance with embodiments of the present invention.

FIG. 1 illustrates a block diagram of a system for configuration of servers for backup within an enterprise computing network 100 in accordance with embodiments of the present invention. Referring to FIG. 1, the network 100 is implemented in a distributed computer environment that may include a primary server 102 and backup server 104 being managed and controlled by a control server 106. The figure shows only a limited number of servers 100 for purpose of simplification, although it should be understood that the network 100 may include other control servers, primary servers, and backup servers, as well as other computing components. Components of the network 102 may be geographically dispersed and managed in a distributed manner. The servers may be communicatively connected via a communications network 108, which may be a local area network (LAN) or wide area network (WAN).

Figure 2:
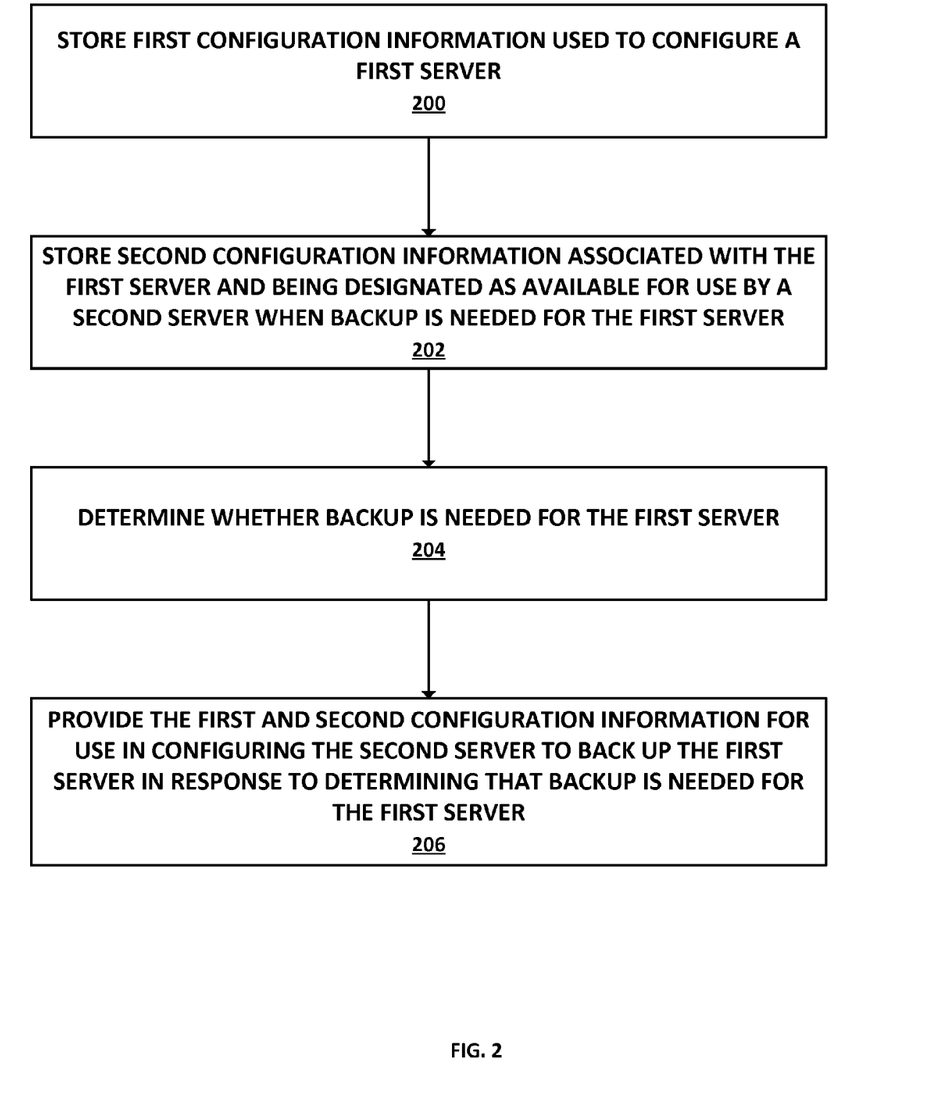
FIG. 2 is a flowchart of an example method for configuring servers for backup in accordance with embodiments of the present invention.

The control server 106 may include a configuration manager 110 operable to configure servers for backup in accordance with embodiments of the present invention. For example, FIG. 2 illustrates a flowchart of an example method for configuring servers for backup. The method may be implemented by the control server 106. The control server 106 may include hardware, software, firmware, or combinations thereof configured to implement the example method. The method of FIG. 2 is described as being implemented by the control server 106 shown in FIG. 1, although the method may be implemented by any suitable server, computing device, or combinations of components.

Referring to FIG. 2, the method includes storing 200 first configuration information used to configure a first server. For example, the primary server 102 shown in FIG. 1 may be assigned to provide service to one or more client computing devices (not shown). The control server 106 may store configuration information 112 including primary configuration information 114 particular to the primary server 102. More specifically, the primary configuration information 114 may include information for configuring primary server 102. The primary configuration information 114 may include profile information such as, but not limited to, port configuration, DVD configuration, network configuration, local storage configuration, fiber storage configuration, and the like. Configuration information 112 may be stored within memory 118 accessible by the configuration manager 110. The control server 106 may also store configuration information for other servers within memory 118. Configuration information may indicate, for example, hardware specifications, software specifications, and the like for a server.

The method of FIG. 2 includes storing 202 second configuration information associated with the first server and being designated as available for use by a second server when backup is needed for the first server. For example, the control server 106 may store backup configuration information 116 within memory 118. The backup configuration information 116 may be associated with the primary server 102 for use in the instance of fail over of the primary server 102 to a backup server. The backup configuration information 116 may be used in any suitable instance in which one or more backup servers, such as one or more of the backup servers 104, are needed to assume functions and responsibilities, either in part or entirely, of the primary server 102.

Backup configuration information, such as information 116, may be extra configurations not needed by the primary server 102, but rather be made available to a pool of backup servers to allow a wider range of backup servers to be a suitable match. The backup configuration information may include extra settings for use by a backup server in the case of failover of the primary server. By providing extra settings, backup servers can be available that may otherwise not be available. For example, backup configuration information 116 does not include fiber storage configuration. By adding the extra fiber storage configuration to the backup configuration information 116, the primary server 102 can be able to fail over to backup servers with fiber storage configuration.

The method of FIG. 2 includes determining 204 whether backup is needed for the first server. For example, the primary server 102 may fail. In another example, the primary server 102 may lose its connection to a client computing device. The primary server 102 may communicate to the control server 106 a message indicating that the server 102 has failed. A network interface 120 may receive the message and deliver contents of the message to the configuration manager 110. The configuration manager 110 may determine that the primary server 102 has failed based on the message contents.

The method of FIG. 2 includes providing 206 the first and second configuration information for use in configuring the second server to back up the first server in response to determining that backup is needed for the first server. For example, the first and second configuration information 114 and 116 may be provided to one or more of the backup servers 104 for use in configuring the backup server(s) to back up the primary server 102.

The configuration may be communicated to the backup server(s) via the network 108. Subsequently, the backup server(s) may use the configuration information for configuring itself for backing up the primary server 102. For example, the backup server(s) may be configured entirely or in part with the primary configuration information 114. In another example, the backup server(s) may be configured entirely or in part with the backup configuration information 116.

Figure 3:
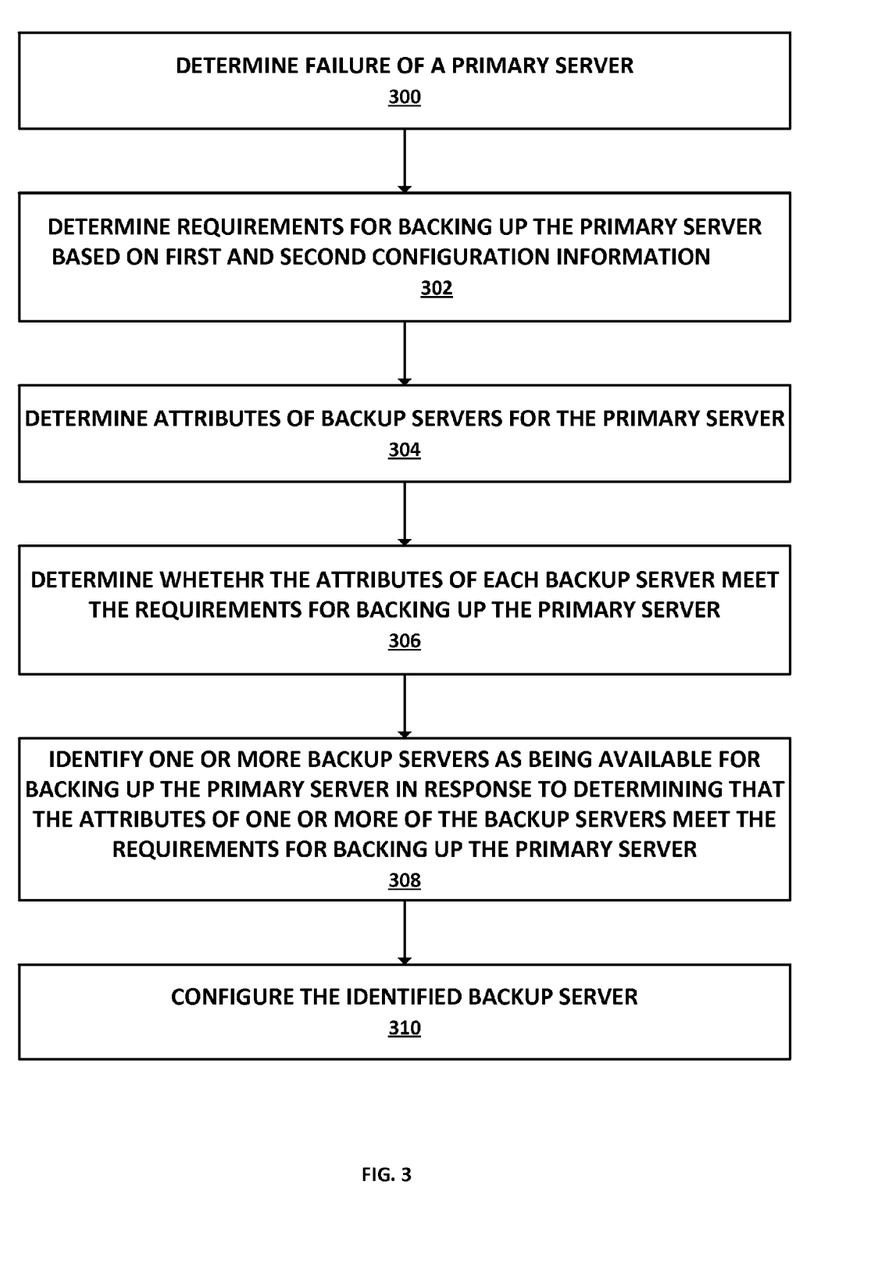
FIG. 3 is a flowchart of another example method for configuring servers for backup in accordance with embodiments of the present invention.

FIG. 3 illustrates a flowchart of another example method for configuring servers for backup in accordance with embodiments of the present invention. The method may be implemented by the control server 106. The method of FIG. 3 is described as being implemented by the control server 106 shown in FIG. 1, although the method may be implemented by any suitable server, computing device, or combinations of components.

Referring to FIG. 3, the method includes determining 300 failure of a primary server. For example, the primary server 102 may be servicing one or more computing devices and subsequently fail. The configuration manager 110 of the control server 106 may detect that the primary server 102 has failed. In this example, the primary server 102 may be configured to use on-board storage.

The method of FIG. 3 includes determining 302 requirements for backing up the primary server based on first and second configuration information. For example, the primary configuration information 116 for the primary server 102 may indicate that the primary server is configured to use on-board storage. The backup configuration information 118 may indicate that fiber channel storage or remote storage may be used for configuring a backup server. The configuration manager 110 may determine the requirements for backing up the primary server 102 based on the primary and backup configuration information 114 and 116.

The method of FIG. 3 includes determining 304 attributes of backup servers for the primary server. For example, the configuration manager 110 may determine attributes of the backup servers 104. Backup servers 104 may communicate to the control server 106 their attributes such as, but not limited to, functionalities, hard drive configuration, unified extensible firmware interface (UEFI) configuration, operating system configuration, redundant array of independent disk (RAID) configuration, fiber configuration, and the like. In an example, backup server 1 104 may have a fiber card and no local storage. Backup server 2 104 does not have a fiber card.

The method of FIG. 3 includes determining 306 whether the attributes of each backup server meet the requirements for backing up the primary server. Continuing the aforementioned example, if the configuration information 114 and 116 indicate that a server having a fiber card or a server without local storage is acceptable, then backup servers 1 and 2 104 meet the requirements.

The method of FIG. 3 includes identifying 308 one or more backup servers as being available for backing up the primary server in response to determining that the attributes of one or more of the backup servers meet the requirements for backing up the primary server. Continuing the aforementioned example, backup servers 1 and 2 104 may be identified as being available for backing up the primary server 102. The best among the backup servers may be selected among those identified. In this example, backup server 2 104 has no fiber card, the same as the primary server 102, thus it may be selected as the best since it is more similar to the primary server 102 than the backup server 1 104.

The method of FIG. 3 includes configuring 310 the identified backup server. Continuing the aforementioned example, the backup server 2 104 may be configured. Configuration information 114 and 116 may be communicated to the backup server 2 104 for use in configuration.

In accordance with embodiments of the present invention, a primary server is configured based on primary configuration information, and is prevented from being configured based on the backup configuration information. For example, the primary server 102 can be configured based on the primary configuration information 114. Further, the primary server 102 may be prevented from being configured based on the backup configuration information 116. The configuration manager 110 may control these functions.

In accordance with embodiments of the present invention, a configuration manager 110 may determine whether backup configuration information is improper to use for configuring a primary server. In response to determining that the backup configuration information is improper to use, the primary server may be prevented from being configured based on the backup configuration information. For example, the primary server may not be capable of implementing a setting specified in the backup configuration information, and in this case, the primary server may be prevented from implementing the setting.

In accordance with embodiments of the present invention, a configuration manager may determine that hardware, software, or another server component is not being used on a primary server. Backup configuration may include an indication that the hardware, software, or other server component is not being used on the primer server. A backup server may be selected based on the indication. For example, if it is indicated that a fiber card is not being used on a primary server, then a backup server may be selected if the backup server does not include a fiber card.

In examples disclosed herein, a configuration manager is described as being implemented within a control server. However, the configuration manager may be implemented in another server or any other suitable computing device. Alternatively, a configuration manager's functions may be implemented across multiple different servers or other computing devices.

In accordance with embodiments of the present invention, a server template may be aware of options for configuration. The configuration options may be aside from ones currently in a hardware inventory. Server proven records may be queried to determine backup servers for a particular primary server. Subsequently, admin may be prompted for a configuration of the prospective backup servers. Configuration information for the prospective backup servers may be stored as backup configuration information. The backup configuration information for the primary server may be stored despite the option not being installed for the primary server. Admin can approve to add extra configuration found by queries to the template, which can make a match more available to backup servers. When the primary server fails, the template can be applied to the best-fit server from a greater pool of backup servers.

In accordance with embodiments of the present invention, a system can be aware of removable option cards provided to a client as part of an order or series of orders. Given that the client has purchased these options, the admin may be prompted for a configuration in the event that a removal option ends up on a particular server. The removable hardware configuration can be added to the template used to back up the primary servers so a greater pool of backup servers can be suitable backup servers with the removable hardware presented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a first server;
    a plurality of backup servers including a second server; and
    at least one processor and memory, the memory storing program instructions that when executed by the processor causes the processor to:
        store first configuration information used to configure the first server;
        store second configuration information associated with the first server and being designated as available for use by the plurality of backup servers when backup is needed for the first server;
        determine whether backup is needed for the first server;
        provide the first and second configuration information for use in configuring one of the plurality of backup servers to back up the first server in response to determining that backup is needed for the first server;
        determine requirements for backing up the first server based on the first and second configuration information;
        determine configuration attributes of the plurality of backup servers;
        determine that the configuration attributes of the second server are most similar to the determined requirements for backing up the first server among the plurality of backup servers;
        configure the second server with the second configuration information in response to determining that attributes of the second server are the most similar to the requirements for backing up the first server among the plurality of backup servers;
        determine whether the second configuration information is improper to use for configuring the second server; and
        prevent implementation of configuration of the second server based on the second configuration information in response to determining that the second configuration information is improper to use.

2. The system of claim 1, wherein the first and second configuration information indicate one of server hardware specification and a software specification.

3. The system of claim 1, wherein the memory storing program instructions cause the processor to:
    configure the first server based on the first configuration information; and
    prevent configuration of the first server based on the second configuration information.

4. The system of claim 1, wherein the memory storing program instructions cause the processor to:
   determine that one of hardware and software is not being used on the first server; and
   store an indication of that the one of the hardware specification and software specification is not being used on the first server.

5. The system of claim 4, wherein the memory storing program instructions cause the processor to select the second server as backup to the first server based on the indication that the one of the hardware specification and the software specification is not being used on the first server.

6. A computer program product for configuring a server for backup, said computer program product comprising:
   a non-transitory computer readable storage medium having computer readable program code embodied in a processor therewith, the computer readable program code causing the processor to perform steps comprising:
   storing first configuration information used to configure a first server;
   storing second configuration information associated with the first server and being designated as available for use by a plurality of backup servers when backup is needed for the first server, the plurality of backup servers including a second server;
   determining whether backup is needed for the first server;
   providing the first and second configuration information for use in configuring one of the plurality of backup servers to back up the first server in response to determining that backup is needed for the first server;
   determining requirements for backing up the first server based on the first and second configuration information;
   determining configuration attributes of the plurality of backup servers;
   determining that the configuration attributes of the second server are most similar to the requirements for backing up the first server among the plurality of backup servers;
   configuring the second server with the second configuration information in response to determining that the configuration attributes of the second server are the most similar to the requirements for backing up the first server among the plurality of backup servers;
   determining whether the second configuration information is improper to use for configuring the second server; and
   preventing implementation of configuration of the second server based on the second configuration information in response to determining that the second configuration information is improper to use.

7. The computer program product of claim 6, wherein the first and second configuration information indicate one of a server hardware specification and a software specification.

8. The computer program product of claim 6, further comprising computer readable program code embodied in a processor therewith, the computer readable program code causing the processor to perform steps comprising:
   configuring the first server based on the first configuration information; and
   preventing configuration of the first server based on the second configuration information.

9. The computer program product of claim 6, further comprising computer readable program code embodied in a processor therewith, the computer readable program code causing the processor to perform steps comprising:
   determining that one of hardware and software is not being used on the first server; and
   storing an indication of that the one of the hardware specification and the software specification is not being used on the first server.

10. The computer program product of claim 9, further comprising computer readable program code embodied in a processor therewith, the computer readable program code causing the processor to perform the step of selecting the second server as backup to the first server based on the indication that the one of the hardware specification and the software specification is not being used on the first server.

11. The system of claim 2, wherein the server hardware specification is one of a port configuration, a DVD configuration, a network configuration, a local storage configuration, and a fiber storage configuration.

12. The computer program product of claim 7, wherein the server hardware specification is one of a port configuration, a DVD configuration, a network configuration, a local storage configuration, and a fiber storage configuration.

13. A method comprising:
   storing first configuration information used to configure a first server;
   storing second configuration information associated with the first server and being designated as available for use by a plurality of backup servers when backup is needed for the first server, the plurality of backup servers including a second server;
   determining whether backup is needed for the first server;
   in response to determining that backup is needed for the first server, providing the first and second configuration information for use in configuring one of the plurality of backup servers to back up the first server;
   determining requirements for backing up the first server based on the first and second configuration information;
   determining configuration attributes of the plurality of backup servers;
   determining that the configuration attributes of the second server is most similar to the requirements for backing up the first server among the plurality of backup servers; and
   in response to determining that the configuration attributes of the second server is most similar to the requirements for backing up the first server among the plurality of backup servers, configuring the second server with the second configuration information;
   determining whether the second configuration information is improper to use for configuring the second server; and
   preventing implementation of configuration of the second server based on the second configuration information in response to determining that the second configuration information is improper to use.

14. The method of claim 13, wherein the first and second configuration information indicate one of a server hardware specification and a software specification.

15. The method of claim 13, further comprising:
   configuring the first server based on the first configuration information; and
   preventing configuration of the first server based on the second configuration information.

16. The method of claim 13, further comprising:
   determining requirements for backing up the first server based on the first and second configuration information;
   determining configuration attributes of a plurality of backup servers for the first server;

determining whether the configuration attributes of each backup server meet the requirements for backing up the first server; and identifying at least one of the backup servers as being available for backing up the first server in response to determining that configuration attributes of the at least one of the backup servers meets the requirements for backing up the first server.

17. The method of claim 13, further comprising determining that one of hardware and software is not being used on the first server, and wherein storing second configuration information comprises storing an indication of that the one of the hardware specification and the software specification is not being used on the first server.

18. The method of claim 17, further comprising selecting the second server as backup to the first server based on the indication that the one of the hardware specification and the software specification is not being used on the first server.

19. The method of claim 14, wherein the server hardware specification is one of a port configuration, a DVD configuration, a network configuration, a local storage configuration and a fiber storage configuration.

* * * * *